(12) United States Patent
Imposti et al.

(10) Patent No.: US 12,479,185 B2
(45) Date of Patent: Nov. 25, 2025

(54) PLANT AND METHOD FOR PRODUCING A CORRUGATED BOARD

(71) Applicant: Fosber S.p.A., Pescaglia (IT)

(72) Inventors: Marco Imposti, Capannori (IT); Gianluca Berrettini, Gragnano (IT)

(73) Assignee: FOSBER S.P.A., Pescaglia (IT)

( * ) Notice: Subject to any disclaimer, the term of this patent is extended or adjusted under 35 U.S.C. 154(b) by 227 days.

(21) Appl. No.: 18/023,575

(22) PCT Filed: Aug. 6, 2021

(86) PCT No.: PCT/EP2021/071984
§ 371 (c)(1),
(2) Date: Feb. 27, 2023

(87) PCT Pub. No.: WO2022/043024
PCT Pub. Date: Mar. 3, 2022

(65) Prior Publication Data
US 2024/0017516 A1 Jan. 18, 2024

(30) Foreign Application Priority Data

Aug. 31, 2020 (IT) .................. 102020000020650

(51) Int. Cl.
*B29C 65/00* (2006.01)
*B31F 1/28* (2006.01)
*B29C 65/40* (2006.01)
*B29C 65/48* (2006.01)
*B29C 65/78* (2006.01)

(52) U.S. Cl.
CPC ............ *B31F 1/284* (2013.01); *B31F 1/2818* (2013.01); *B31F 1/285* (2013.01); *B31F 1/2872* (2013.01); *B29C 65/40* (2013.01); *B29C 65/48* (2013.01); *B29C 65/7861* (2013.01); *B29C 65/7894* (2013.01)

(58) Field of Classification Search
CPC ..... B29C 65/40; B29C 65/48; B29C 65/7861; B29C 65/7894; B31F 1/284
See application file for complete search history.

(56) References Cited

U.S. PATENT DOCUMENTS

| | | | |
|---|---|---|---|
| 6,966,961 B2 | 11/2005 | Adami | |
| 7,441,579 B2 | 10/2008 | Adami | |
| 7,952,714 B2 | 5/2011 | Kraus et al. | |
| 8,714,223 B2 | 5/2014 | Adami et al. | |

(Continued)

FOREIGN PATENT DOCUMENTS

| | | |
|---|---|---|
| DE | 102015201180 A1 | 7/2015 |
| EP | 0134865 A1 | 3/1985 |

(Continued)

*Primary Examiner* — Philip C Tucker
*Assistant Examiner* — Nickolas R Harm
(74) *Attorney, Agent, or Firm* — Breiner & Breiner, L.L.C.

(57) ABSTRACT

The plant for producing a corrugated board includes one or more single facers and a double facer, as well as respective unwinders for unwinding reels of paper webs. Arranged along the production line, in suitable positions, are thermographic cameras which acquire images through which it is possible to trace the various characteristics of the cardboard, for example the moisture content thereof, detect manufacturing defects, after which it is possible to intervene on one or more process parameters so as to eliminate the causes of the defects.

13 Claims, 9 Drawing Sheets

(56) References Cited

U.S. PATENT DOCUMENTS

| | | |
|---|---|---|
| 10,518,996 B2 | 12/2019 | Adami |
| 10,618,242 B2 | 4/2020 | Adami |
| 2012/0193026 A1 | 8/2012 | Adami |
| 2015/0158264 A1 | 6/2015 | Sofinowski |
| 2019/0120779 A1 | 4/2019 | Vonderheiden |
| 2019/0185283 A1 | 6/2019 | Adami |

FOREIGN PATENT DOCUMENTS

| | | |
|---|---|---|
| EP | 1258722 A1 | 11/2002 |
| EP | 1362690 A1 | 11/2003 |
| EP | 1491326 A1 | 12/2004 |
| EP | 1647508 A1 | 4/2006 |
| EP | 1757548 A1 | 2/2007 |
| EP | 2484516 A1 | 8/2012 |
| WO | 2017036685 A1 | 3/2017 |

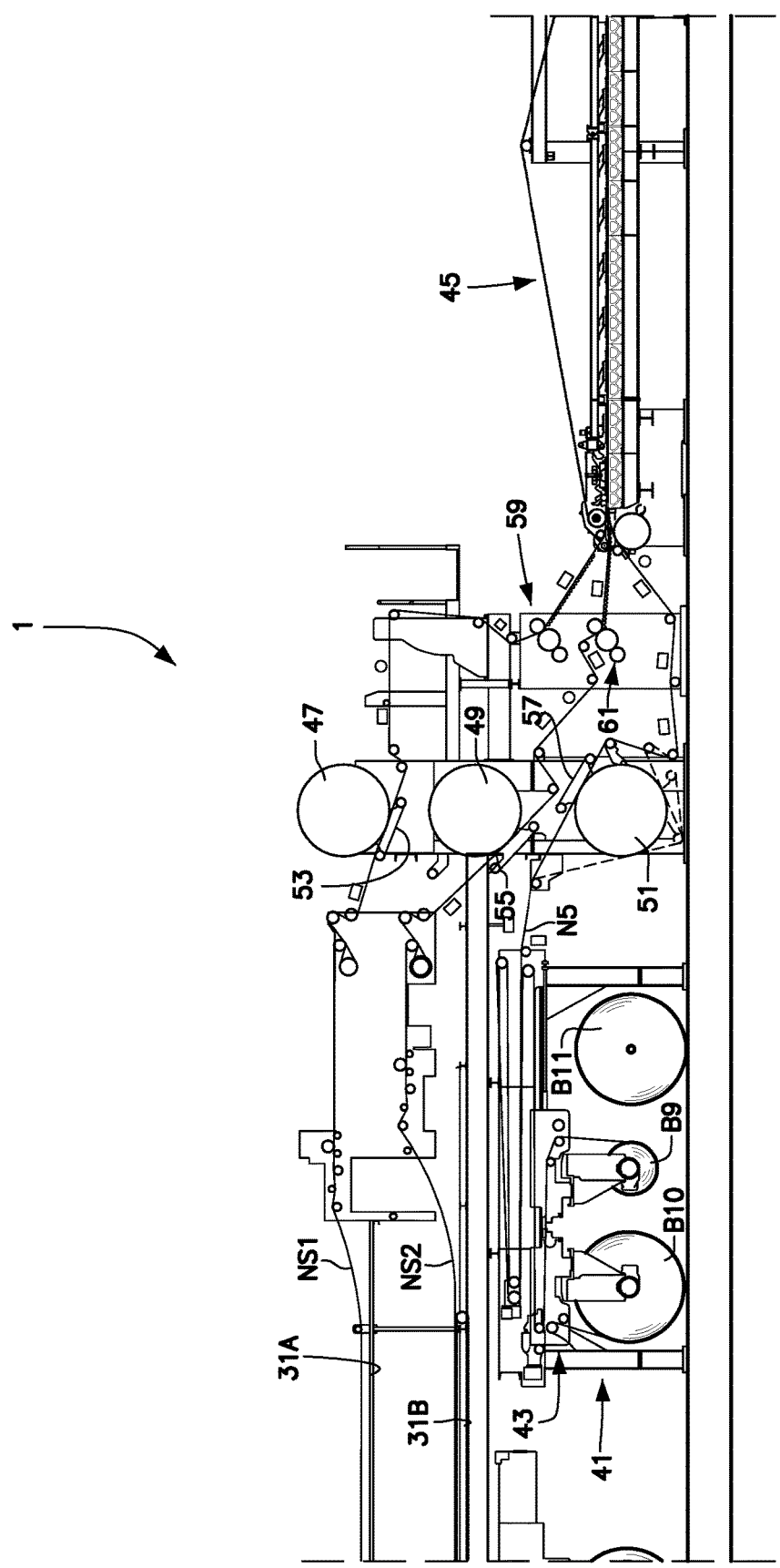

PLANT AND METHOD FOR PRODUCING A CORRUGATED BOARD

TECHNICAL FIELD

The present invention relates to improvements to plants and methods for producing a corrugated board.

BACKGROUND ART

The corrugated board is a cellulosic article typically comprising at least one fluted paper sheet, glued between two smooth paper sheets, also referred to as liners. In some cases, the corrugated board comprises more than two fluted paper sheets. Between each pair of fluted paper sheets a smooth paper sheet is interposed and two outer smooth paper sheets (liners) define the two outer faces of the corrugated board sheet.

Typically, the corrugated board is produced by means of a complex processing line, which comprises one or more single facers, a double facer and a plurality of unwinders. These components form the so-called "wet-end" of the line, that is, the portion of the line in which moisture and heat for carrying out the paper corrugation operations and operations for gluing the continuous webs of fluted paper and smooth paper which combine to form the finished corrugated board are present.

Arranged downstream of the wet-end is the so-called "dry-end", that is that part of the line in which there are carried out the operations for the longitudinally scoring and slitting the continuous corrugated board web formed in the wet-end, as well as possibly the operations of transversely cutting the corrugated board web to form single sheets, and stacking the sheets to form stacks of sheets intended for packaging and shipping.

More specifically, in the wet-end each single facer forms a respective continuous web of single face corrugated board, consisting of a continuous smooth paper web and a continuous fluted paper web glued together along the ridges of the flutes formed in the corrugated paper sheet. In the so-called double facer, a single face corrugated board web is glued to a smooth paper web, or two or more continuous single face corrugated board webs are glued together and to a continuous smooth paper web. The continuous smooth paper web forms the second liner of the finished continuous corrugated board web, whose first liner is formed by the smooth paper web of one of the single face corrugated board webs supplied to the double facer.

These operations performed under heating, are particularly sensitive, given that the temperature and moisture have a very marked impact on the final quality of the corrugated board sheets which are obtained by cutting the continuous corrugated board web. Gluing defects, due to the presence of excessive amounts of adhesive agent, or to insufficient adhesive agent, or due to incorrect gluing temperature and pressure values, can lead to waste products.

Uneven moisture content and/or inappropriate temperature values along the transversal and longitudinal extension of the continuous paper webs and paper board and/or between the two liners of the corrugated board can generate bends (warping) of the corrugated board sheets, gluing defects and other drawbacks that adversely affect the quality of the finished product.

In particular, the temperature of the various continuous paper and board webs in the production process is a parameter of fundamental importance for several reasons. Specifically, the temperature affects the formation of waves in the corrugated paper web, the penetration of the adhesive agent into the paper, the completion of the final gluing, the possible deformations due to the warping of the final sheet.

In currently known plants, infrared temperature sensors are used combined with a feedback loop in order to manage the production cycle by means of a process controller. In order to control and eliminate or reduce warping deformations, it is important to check the difference in moisture content between the outer smooth paper webs (liners) of the paper board in the direction transverse to the machine direction, i.e. to the direction in which the continuous webs advance along the processing line.

Warping problems may arise when the continuous paper webs (especially the outer liners) have different moisture content prior to being glued. In this case, after gluing, tensile stress—caused by the different shrinkage in transversal direction between the layers forming the covers—arise inside the corrugated board sheet with an ensuing bending of the corrugated board sheet.

As a matter of fact, if two smooth paper sheets of the corrugated board have different moisture content at the end of the production process, the paper sheets will absorb different amounts of moisture during the storage period subsequent to production. The sheet having a lower moisture content will tend to absorb more moisture. Absorption (or release to the environment) of moisture causes a change in the size of the smooth paper sheet. In particular, moisture absorption causes an elongation, which increases as the absorbed moisture increases. An amount of moisture present in the paper web higher than the moisture content in the environment can cause moisture to be released to the environment, resulting in a shrinkage of the smooth paper sheet, which increases as the amount of moisture released increases.

If the two outer smooth sheets (liners) of the corrugated board have different moisture content, they will be subject to different dimensional changes. Given that the smooth paper sheets are bonded to one another by gluing with one or more intermediate layers of fluted paper, this gradient of elongation or shortening between the various layers of smooth paper induces internal tensile stress and warping of the corrugated board sheet.

In order to avoid, or at least reduce, these drawbacks, it is crucial to reduce the differences in moisture content of the various continuous paper webs used in the production of the corrugated board.

Moisture sensors may be used to this end. However, these sensors are complex and expensive devices which, moreover, require frequent calibration. They therefore are critical and complex components of corrugated board production lines.

On the other hand, it is known that there is a variable link between the temperature of the paper and the moisture content thereof. This link for example depends on the paper grammage and the type of slurry used for the production thereof. On the other hand, however, a temperature difference corresponds to a proportional moisture difference and vice versa.

Thus, temperature sensors are sometimes used in corrugated board production lines instead of moisture sensors. Infrared temperature sensors predict moisture differences in the paper. Infrared temperature sensors are not affected by the drawbacks of moisture sensors, and in particular they are more reliable over time, more cost-effective, less cumbersome and easier to adjust.

However, infrared sensors do not provide particularly accurate information, especially as regards the resolution of the measurements carried out.

Therefore, the need exist to improve corrugated board production lines in terms of controlling the temperatures and/or moisture of continuous paper and board webs.

SUMMARY

According to an aspect, disclosed herein is a plant for producing a corrugated board, comprising: a first unwinder for unwinding a first continuous paper web from a first reel; a second unwinder for unwinding a second continuous paper web from a second reel; a third unwinder for unwinding a third continuous paper web from a third reel. The plant further comprises a single facer configured to: receive the first continuous paper web and the second continuous paper web; corrugate the first continuous paper web; and glue together the first continuous paper web and the second continuous paper web along corrugation crests formed in the first continuous paper web and form a continuous single face corrugated board web. The plant further comprises a double facer configured to receive the continuous single face corrugated board web and the third continuous paper web and glue the continuous single face corrugated board web and the third continuous paper web together along corrugation crests formed in the first continuous paper web and form a continuous corrugated board web. Characteristically, the plant comprises at least one first thermographic camera positioned along an advancement path of at least one of said: first continuous paper web, second continuous paper web, third continuous paper web, continuous single face corrugated board web, continuous corrugated board web, for detecting thermographic images of said at least one continuous web. Also provided is a control system, comprising a thermographic image processing system which, for each thermographic camera, is adapted to: extrapolate—in real time from the thermographic images acquired by means of the thermographic camera—temperature profiles according to lines transversal to the advancement direction of the continuous web framed by the thermographic camera; and determine a maximum value, a minimum value, and an average value of the temperature along each temperature profile.

The temperature can be detected on the upper surface, or on the lower surface, or on both surfaces of the respective continuous web.

In general, the plant may also comprise a greater number of single facers and respective unwinders, as will be illustrated below with reference to an embodiment illustrated in the attached drawings.

As can be understood from the above and as will be more apparent from the detailed description that follows, in the line or plant of the type addressed herein, there are processed several continuous webs which may consist of a single paper web or several paper webs, typically a smooth paper web and a fluted paper web, glued together. Many functions and members described herein may relate to continuous webs consisting of single webs or webs bonded to each other. Therefore, in the present description and in the attached claims, unless specified otherwise, the expression "continuous web" generally indicates any of the continuous webs that are processed in the corrugated board production plant. Such continuous web may consist of a single paper web (either fluted or smooth), or a composite web, formed by two or more paper webs (smooth and/or fluted) bonded to each other.

For example, the expression "continuous web" without any other specification may relate to or comprise: a continuous smooth paper web, a continuous fluted paper web, a continuous single face corrugated board web comprising a continuous smooth paper web glued to a continuous fluted paper web, a continuous corrugated board web, comprising two or more continuous smooth paper webs and one or more continuous fluted paper webs glued to each other.

In advantageous embodiments, the control system may be configured to generate an alarm when the difference between the maximum temperature value and the minimum temperature value along a temperature profile exceeds a threshold value. In other embodiments, the control system may be configured to automatically intervene on one or more operating parameters of the production line or plant, to correct the detected abnormal condition.

In some embodiments, the control system may be configured to modify at least one process parameter as a function of the detected average temperature value, or as a function of the difference between the maximum value and the minimum value.

For example, along the path of the continuous web, in which the thermographic camera is inserted, a heating member may be arranged, which co-acts with the continuous web to transfer heat thereto. In this case, the process parameter may be a parameter adapted to modify the heating conditions of the continuous web by means of the heating member. For example, it is possible to change the arc of contact between the continuous web and the heating member, increasing or decreasing it to increase or decrease the temperature of the continuous web. Additionally, or alternatively, it is possible to intervene by adding steam and/or water on the continuous web, so as to change the heat exchange conditions and therefore the heating conditions of the continuous web, with ensuing change of the temperature thereof.

In advantageous embodiments, at least one second thermographic camera is arranged in the path of the continuous web, in which the thermographic camera is inserted. The two thermographic cameras are arranged downstream and upstream of the heating member with respect to the advancement direction of the respective continuous web.

In advantageous embodiments, along one or more paths of respective continuous webs of the plant there may be provided members adapted to detect the transversal dimension of the continuous web and the change of such transversal dimension, for example when passing through one or more heating devices. The change in the transversal dimension of the continuous web is related to a change in moisture content. The decrease in the moisture content entails a shrinkage, that is a decrease in the transversal dimension of the continuous web.

According to another aspect, described herein is a method for producing a corrugated board, comprising the following steps:
unwinding a first continuous paper web from a first reel;
unwinding a second continuous paper web from a second reel;
unwinding a third continuous paper web from a third reel;
by means of the first continuous paper web and the second continuous paper web forming a continuous single face corrugated board web in a single facer;
by means of the continuous single face corrugated board web and the third continuous paper web, forming a continuous corrugated board web by means of a double facer;

detecting thermographic images of at least one of said: first continuous paper web, second continuous paper web, third continuous paper web, continuous single face corrugated board web, continuous corrugated board web, by means of at least one first thermographic camera positioned along an advancement path of the respective continuous web;

extrapolating—in real time from the thermographic images acquired by each thermographic camera—temperature profiles of the respective continuous web along lines transverse to the advancement direction of the continuous web framed by the thermographic camera; and preferably determining—along each temperature profile—a mean, a maximum and a minimum temperature value.

Further advantageous features and embodiments of a plant for producing a corrugated board and the relative method are described hereinafter with reference to the attached drawings, and in the attached claims, which are an integral part of the present description.

In the present description and in the attached claims reference will be frequently made to individual thermographic cameras located in different positions along the production line. It should be noted that each thermographic camera may actually in turn consist of a plurality of individual thermographic cameras aligned with each other, if this is necessary or useful to acquire images covering the entire width of the continuous web.

BRIEF DESCRIPTION OF THE DRAWINGS

The invention will be clearer from the description and the attached drawings, which illustrate an embodiment provided by way of non-limiting example of the invention. More particularly, in the drawing:

FIGS. 1A, 1B, 1C and 1D show successive portions of a corrugated board production line or plant;

DETAILED DESCRIPTION

FIGS. 1A, 1B, 1C and 1D show successive portions of a part of a corrugated board production line or plant and more precisely the so-called wet end, that is, the part comprising the unwinders of the paper reels, the single facers and the double facer. Hereinafter, reference is made to the main elements of this line, which is per se known to those skilled in the art, useful for the intelligibility of the innovations subject of the invention.

Figure 1A:
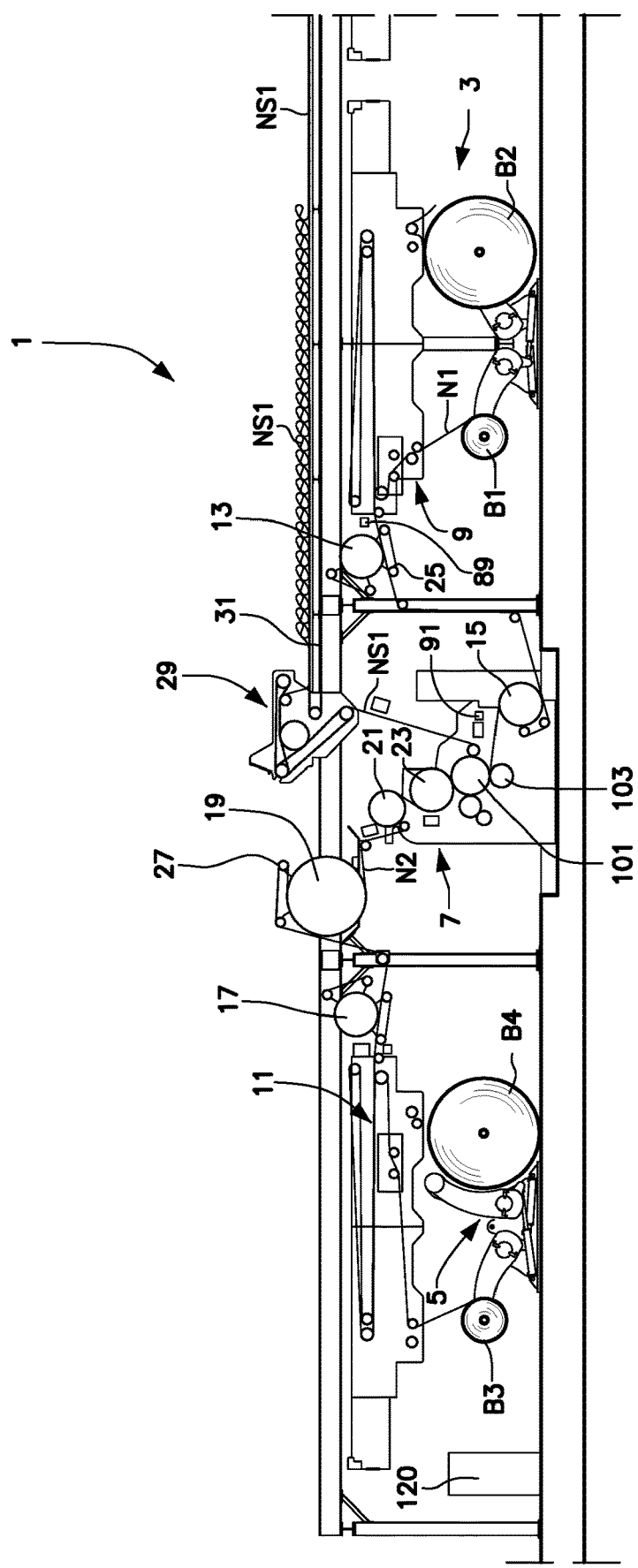

Starting from FIG. 1A, the line or plant, indicated in its entirety with 1, comprises a first unwinder 3 for unwinding a first continuous smooth paper web N1, and a second unwinder 5 for unwinding a second continuous smooth paper web N2.

Unwinders for this type of plant are known, for example from EP134865, EP1647508, US20190185283, DE102015201180.

The first continuous smooth paper web N1 and the second continuous smooth paper web N2 are supplied to a first single facer 7, wherein the first continuous smooth paper web N1 is fluted and glued to the second continuous smooth paper web N2, to form a first continuous single face corrugated board web NS1.

Examples of single facers are disclosed in U.S. Pat. Nos. 10,618,242, 8,714,223, EP1362690.

In order to ensure continuity of supply of the first continuous paper web N1 and of the second continuous paper web N2, each of the two unwinders 3, 5 comprises a respective splicer 9, 11 which serves to join webs coming from the reels B1, B2 and B3, B4 found in the two unwinders 3, 7, one of which (reels B1 and B3 in the configuration of FIG. 1A) is being unwound and the other (reels B2 and B4 in FIG. 1A) is standing-by.

Examples of splicers are disclosed in U.S. Pat. Nos. 10,518,996, 7,441,579, 6,966,961.

Along the supply path of the continuous paper webs N1 and N2 there are arranged heating members indicated with 13 and 15 for the continuous paper web N1 and 17, 19, 21 and 23 for the continuous paper web N2. In the illustrated embodiment, the heating members comprise heating rollers, heated for example by means of steam. In other embodiments, heating plates or combinations of plates and rollers may be used. The number of heating members may different from the number indicated above. In principle there could be a single heating member along each of the two paths for supplying the continuous paper webs N1, N2 to the single facer 7. Specifically, the rollers 23 are pressure rollers which, besides providing heat, press together a corrugated paper web and a smooth paper web on a corrugating roller 101 (FIG. 3) of the respective single facer. In other embodiments, the rollers 23 may be replaced by belt systems, which similarly apply pressure to the continuous paper webs supplied through the respective single facer.

At least one heating member along each path for supplying the continuous paper webs N1, N2 may be associated with a device for adjusting the arc of contact between the respective continuous paper web N1, N2 and the heating member. FIG. 1A shows an adjustment device labelled with 25 which is associated with the path of the paper web N1 and an adjustment device labelled with 27 which is associated with the path of the paper web N2. Preferably, each heating member is provided with its own adjustment device.

The continuous single face corrugated board web NS1 is supplied to a section of the line where a double facer for gluing the continuous single face corrugated board web to other components of corrugated board is arranged. The double facer section is described hereinafter and illustrated in FIGS. 1C, 1D. In order to advance the continuous single face corrugated board web NS1 along line 1, the latter provides a bridge 31 which extends above the floor and above the underlying machines for producing the continuous single face corrugated board web NS1. In order to supply the continuous single face corrugated board web NS1 to the bridge 31, a lifting unit, indicated with 29, is provided. This can be designed, e.g., as disclosed in US2020/0031604.

Figure 1B:
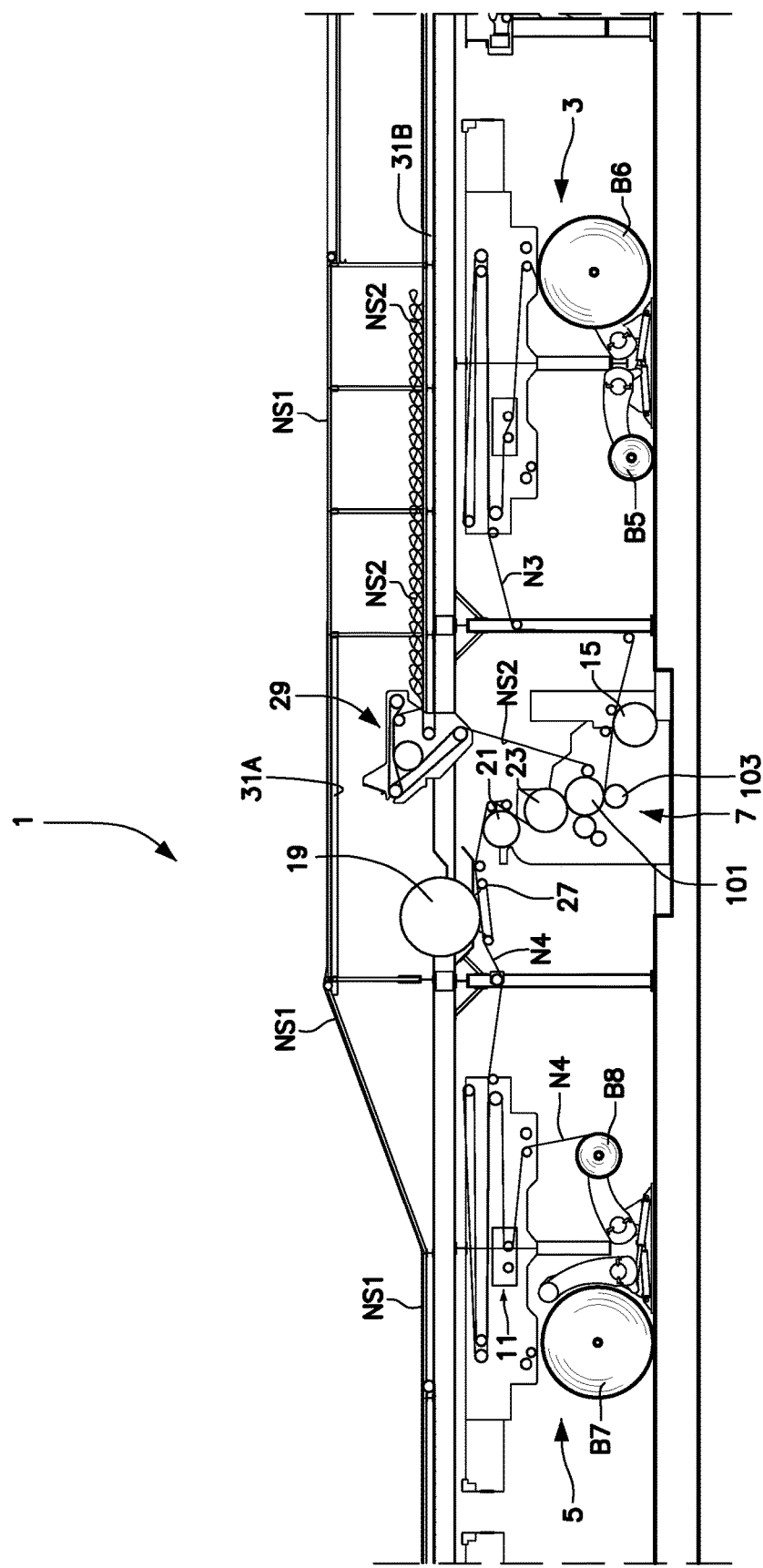
Figure 1D:
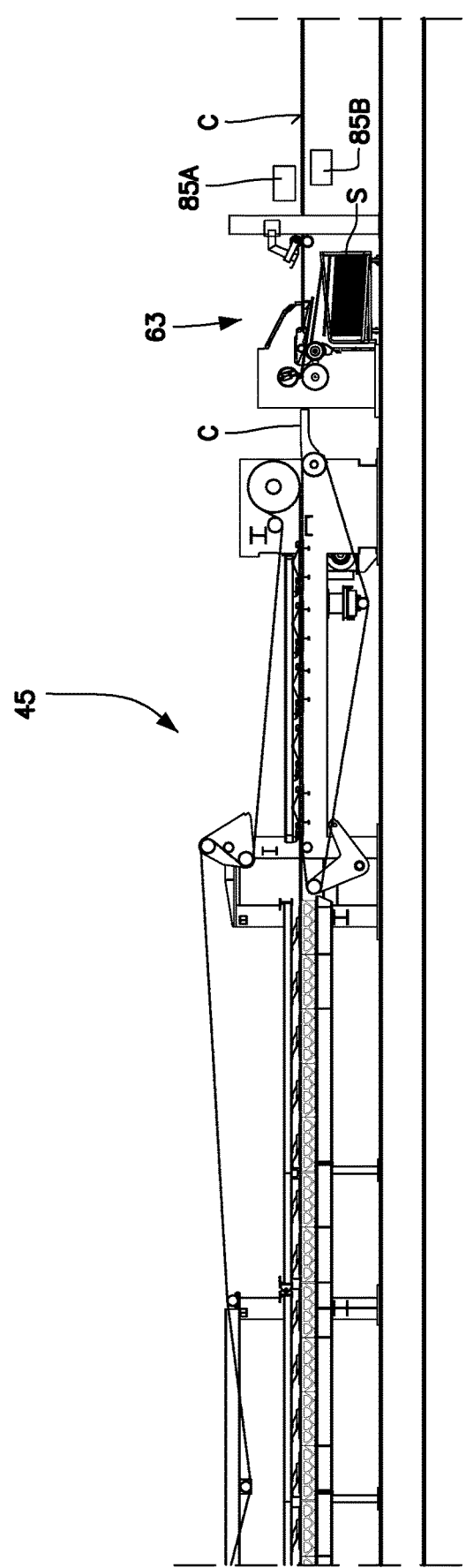

The line 1 illustrated in FIGS. 1A, 1B, 1C, 1D comprises a second section, in series with the first section illustrated in FIG. 1A, and including a second single facer with respective unwinders for unwinding continuous smooth paper webs, for producing a second continuous single face corrugated board web NS2. The second section is shown in FIG. 1D and the components thereof, being substantially the same as those of the first section illustrated in FIG. 1A, are indicated with the same reference numbers, except as regards the reels from which the two respective continuous smooth paper webs indicated with N3, N4, which are supplied to the single facer 7, are unwound. In FIG. 1B the reels (the one being unwound and the one standing by) are indicated with B5, B6, B7 and B8.

The two continuous single face corrugated board webs NS1, NS2 advance along the bridge 31 on two distinct and superimposed levels, indicated in FIG. 1B with 31A and 31B.

The number of single facers and therefore of continuous single face corrugated board webs NS1, NS2, ... NSi which can be produced may vary depending on the configuration of the line. The one indicated in FIG. 1 is a line that can produce single flute or a double flute corrugated board, depending on whether only one or both of the single facers are operating. The possibility of arranging more than two single facers and relative unwinders and splicers in line, in order to produce a corrugated board with a number of waves greater than two, cannot be ruled out.

Downstream of the second single facer illustrated in FIG. 1B, along the line 1 there is arranged a fifth unwinder 41 for a further continuous smooth paper web, indicated with N5. In the illustrated embodiment, the unwinder 41 may contain three paper reels indicated with B9, B10 and B11, and it comprises a splicer 43 for splicing two webs coming from different reels, in order to ensure continuous supply of the continuous smooth paper web N5.

The continuous smooth paper web N5 is supplied, together with the two continuous single face corrugated board webs NS1 and NS2, to a double facer 45, where the three continuous webs NS1, NS2 and N5 are glued together. Heating members for each of the continuous webs NS1, NS2, N5 are arranged upstream of the double facer 45. In the illustrated embodiment, the heating members upstream of the double facer 45 are indicated with 47, 49, 51 for the continuous webs NS1, NS2 and N5, respectively. In the illustrated embodiment, each heating member comprises a roller heated by means of steam, for example, but different configurations, using for example hot plates or combinations of several heating members, cannot be ruled out.

Each heating member 47, 49 and 51 comprises a respective device for adjusting the arc of contact between the respective continuous web and the heating member. The adjustment devices are indicated with 53, 55 and 57.

Downstream of the heating members along the paths of the continuous webs NS1 and NS2 are provided gluing devices 59, 61, for applying an adhesive agent to the flutes of the continuous webs N1, N3 which are fluted by the single facers 7 described above, so that, by placing them one on top of the other the continuous webs NS1, NS2, N5 are glued at the flutes of the continuous corrugated webs N1, N3A. Gluing is carried out by advancing the continuous webs NS1, NS2, N5 along the double facer 45. Pressure members, which press the continuous webs together and against the double facer, are provided above the continuous webs NS1, NS2, N5.

Examples of single facers and related pressure members are disclosed in US20120193026, EP2484516, EP1491326.

Downstream of the double facer 45 a cutter 63 for removing waste S is provided, shown in FIG. 1D, where the last portion of the double facer section 45 with the drive members of the continuous corrugated board web C formed along the double facer by bonding the continuous single face corrugated board webs NS1, NS2 and the continuous smooth paper web N5.

Figure 2:
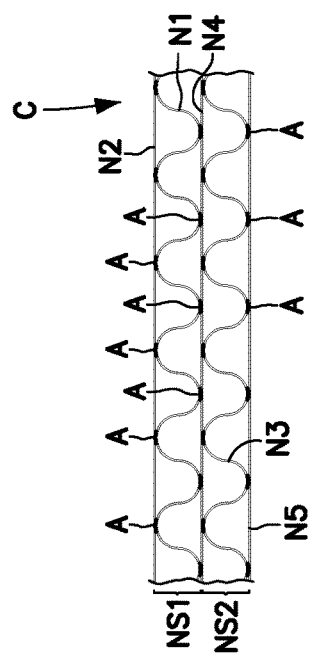
FIG. 2 shows a portion of corrugated board in section according to a plane in the machine direction.

FIG. 2 schematically illustrates a section of the continuous corrugated board web C which is obtained at the outlet of the double facer 45. The adhesive agent which bonds together the continuous webs N1, N2, N3, N4, N5 and which was applied by the gluing devices 59, 61, as well as by gluing devices of the single facer 7A, is indicated with A.

Figure 3:
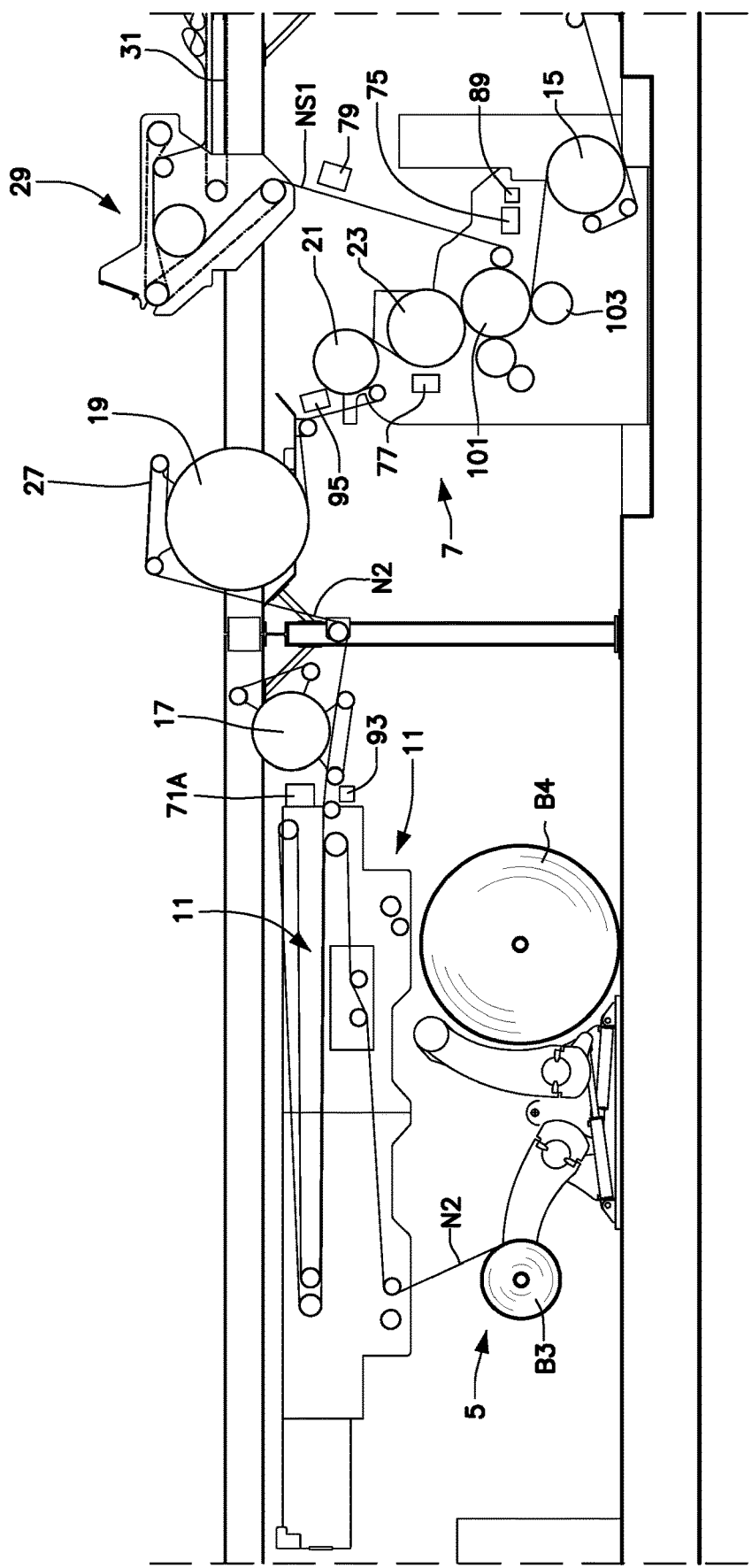
FIGS. 3 and 4 show enlargements of parts of the production line.
Figure 4:
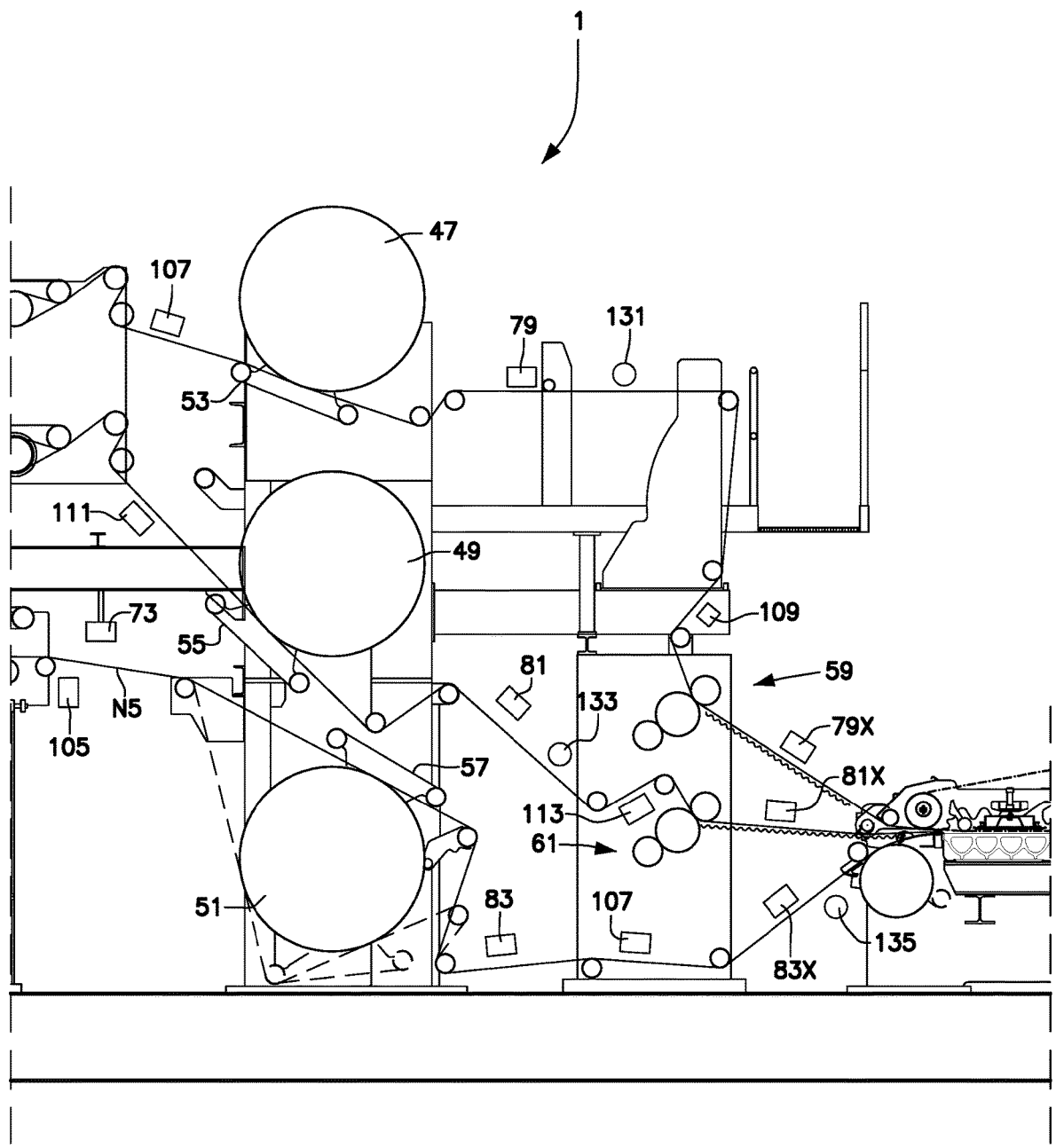

FIGS. 3 and 4 show enlargements of the line portion containing an unwinder 5 and a single facer 7, and of the portion line containing the unwinder 41 and the initial part of the double facer section 45, respectively.

According to embodiments disclosed herein, the line 1 comprises one or more thermographic cameras, i.e. video cameras adapted to capture infrared images of one or the other of the aforementioned continuous webs, i.e. of the continuous paper webs N1, N2, N3, N4, N5, of the continuous single face corrugated board webs NS1, NS2 and of the continuous corrugated board web C.

Described hereinafter is a particularly advantageous and complete arrangement of thermographic cameras. However, it should be noted that in other embodiments a smaller number of thermographic cameras can be provided and that therefore one or more of the illustrated thermographic cameras may be omitted.

Specifically, a thermographic camera 71, paired with each splicer of each unwinder may be provided. Specifically, a thermographic camera 71 paired with the splicer 11 of the unwinder 5 is indicated in the drawing. It should be noted that similar thermographic cameras 71 may be combined with each splicer of each unwinder combined with the single facers 7.

A thermographic camera 73 may be associated with the splicer 43 of the unwinder 41 (FIG. 4). Thermographic cameras are omitted in FIGS. 1A, 1B, 1C and 1D for greater ease of representation.

Basically, as many thermographic cameras as the number of points for feeding continuous smooth paper webs toward machines (single facers, double facer) of the line 1 can be provided.

In embodiments further thermographic cameras associated with one or both single facers 7 may be provided. FIG. 3 shows thermographic cameras 75, 77 and 79. The thermographic camera 75 is positioned to detect thermographic images of the continuous smooth paper web N1 or N3, the thermographic camera 77 is positioned to detect thermographic images of the continuous smooth paper web N2 or N4 and the thermographic camera 79 is arranged to detect thermographic images of the continuous single face corrugated board web NS1 or NS2, respectively. The thermographic cameras 75 and 77 are arranged downstream of the respective heating members along the path of the continuous smooth paper webs, so as to detect the temperature of the respective continuous web after heating.

Further thermographic cameras may be associated with the continuous webs entering the double facer 45 and more specifically between the heating members 47, 49, 51 and the inlet to the double facer 45. These thermographic cameras are indicated with 79, 81 and 83 in FIG. 4 and omitted in FIG. 1D. FIG. 4 also shows alternative positions 79X, 81X, 83X of the thermographic cameras 79, 81, 83, downstream of the gluing devices and closer to the double facer 45.

In some embodiments, a further video camera 85 may be provided downstream of the double facer 45, as schematically indicated in FIG. 1D. In this figure, the thermographic camera 85 is double and it comprises an upper thermographic camera and a lower thermographic camera 85B for capturing images of the two liners, i.e., of the continuous webs N2 and N5 of the corrugated board web C.

In the illustrated embodiment, the video cameras 85 are at some distance from the exit side of the double facer 45. In other embodiments, it may instead be provided that the video cameras 85 be arranged immediately downstream of the double facer 45.

Additionally or alternatively to the video camera/s 85 downstream of the double facer 45, video cameras may also be provided along the double facer 45.

Besides the thermographic camera 85, even one or more of the remaining thermographic cameras mentioned above may be double, in the sense that in a given position, or also in different positions of the same path of the continuous web, a thermographic camera may be provided on each face of the respective continuous web, as explicitly indicated for the thermographic camera 85 (85A, 85B) downstream of the double facer 45.

Furthermore, each thermographic camera may actually comprise multiple units aligned in the cross-machine direction to cover the entire width of the respective continuous web.

Said thermographic cameras may be configured to capture infrared images of the respective continuous webs, in order to detect temperature profiles, as described in greater detail hereinafter.

In some embodiments, thermographic cameras may also be used to obtain, from the respective images, a measurement of the effective width, that is the dimension in the cross-machine (transversal) direction, of the respective continuous web framed by the thermographic cameras, for the purposes described in greater detail hereinafter.

Alternatively, the width, that is the dimension in the transversal direction and therefore the change in this width (that is, the shrinkage of the continuous web) of one or more of the continuous webs can be detected by means of a different system dedicated to the purpose. For example, video cameras can be used that capture the image in the visible, from which the transverse dimension of the respective continuous web can be obtained by means of an image processing software.

In other embodiments, dedicated systems for detecting the transversal (cross-machine) dimension, and hence the possible transversal shrinkage, of one or more continuous webs comprising linear arrais of pairs of optical emitters and receivers may be positioned along the line 1, in order to detect the position of the two longitudinal edges of the respective continuous web and obtain the width of the continuous web therewith. The possibility of using sensors of another type, for example capacitive sensors, or contact electrodes which—arranged in pairs above and below the path of the web—open and close an electrical contact depending on whether the continuous web is present or absent therebetween, cannot be ruled out.

In some embodiments, each transverse (cross-machine) shrinkage detection system may comprise a first device for detecting the transverse (cross-machine) dimension and a second device for detecting the transverse dimension of the continuous web. The first device for detecting the transverse dimension of the continuous web and the second device for detecting the transverse dimension of the continuous web may be arranged respectively upstream and downstream of a heating member along the advancement path of the respective continuous web. In this manner, the shrinkage detection system is capable of detecting the change in transverse dimension caused by the heating of the continuous web caused by the heating member.

In some embodiments, there are provided respective systems for detecting the transverse shrinkage along the advancement path of two or more continuous webs which converge in an area of mutual gluing of the continuous webs.

For example, a respective first system for detecting the transverse shrinkage and a respective second system for detecting the transverse shrinkage may be arranged along the path for supplying the first continuous smooth paper web N1, N3 and along the path for supplying the second continuous smooth paper web N2, N4 to the respective single facers 7.

By way of example, FIGS. 1A and 3 schematically show a first system for detecting the transverse shrinkage of the continuous smooth paper web N1, the system comprising a respective first device 89 for detecting the transverse dimension, arranged upstream of the heating member 13 and a respective second device 91 for detecting the transverse dimension arranged downstream of the heating member 15, i.e. directly upstream of the nip between two corrugating rollers 101, 103 of the respective single facer 7.

FIGS. 1A and 3 schematically show a second system for detecting the transverse shrinkage of the continuous smooth paper web N2, the system comprising a respective first device 93 for detecting the transverse dimension, arranged upstream of the heating member 17 and a respective second device 95 for detecting the transverse dimension arranged downstream of the heating member 19.

The systems for detecting the transverse shrinkage, comprising the devices 89, 91, 93 and 95 for detecting the transverse dimension, allow to detect the transverse shrinkage that the continuous smooth paper webs N1, N2, which converge and are glued in the first single facer 7, are subjected to. Similar devices for detecting the transverse dimension may be provided to detect the transverse shrinkage of the continuous smooth paper webs N3, N4, which converge and are glued in the second single facer 7.

Similarly, systems for detecting the transverse shrinkage of the continuous webs which converge toward the double facer 45 may be provided.

For example, a system for detecting the transverse shrinkage of the continuous smooth paper web N5 coming from the unwinder 41, may be provided. This system for detecting the transverse shrinkage may comprise a first device 105 (FIG. 4) for detecting the transverse dimension of the continuous smooth paper web N5, arranged upstream of the heating member 51, and a second device 107 for detecting the transverse dimension of the continuous smooth paper web N5, arranged downstream of the heating element 51.

Similarly, systems for detecting the transverse shrinkage of the continuous single face corrugated board webs NS1 and NS2 may be provided upstream and downstream of the heating members 47 and 49. In short, these systems for detecting the transverse shrinkage comprise respective first and second devices for detecting the transverse dimension of the continuous single face corrugated board webs NS1, NS2, indicated with 107, 109, 111 and 113, respectively (FIG. 4).

The thermographic cameras and the devices for detecting the transverse dimension are interfaced with a control system schematically indicated with 120 in FIG. 1A. The control system 120 may be configured to carry out line control and management operations comprising the operations described hereinafter.

The thermographic cameras 71, 73, 75, 77, 79, 81, 83, 85A, 85B may be used to acquire thermal images of the respective continuous web preferably continuously over time. Although less advantageous, the possibility of capturing thermal images at time intervals spaced from each other, for example to reduce the computational burden of the image detection and processing systems, cannot be ruled out.

Each acquired image consists of a pixel matrix, arranged according to lines transverse to the advancement direction of the respective continuous web (direction CD: Cross direction) and according to columns parallel to the advancement direction of the respective continuous web (MD: Machine Direction). For each thermographic camera, the signal coming from at least one pixel line oriented in a transverse direction can be stored and processed. The signals of these pixels are a function of the temperature of the continuous web along a transverse line captured in each frame acquired by the thermographic camera. Therefore, the signals of these pixels provide an indication of the temperature pattern in transverse direction. The sequence of lines acquired in real time by a specific pixel line by the thermographic camera provides a real-time indication of the temperature profile in the CD direction.

It is known that the temperature reached by a wet paper web—due to contact with a heating member—is proportional to the moisture content of the web. This is due to the fact that the greater the moisture contained in the cellulosic fibres forming the paper web, the greater the heat transferred from a heating member to the continuous paper web. Therefore, the trend of the temperature along a line in the transverse direction gives an indication of the trend of the moisture content along this line.

The control system 121 is configured so as to use the temperature profiles detected by means of the various thermographic cameras of the production line in order to verify whether there are changers or discontinuities in temperature and therefore in moisture in the transverse direction, which can be due to multiple causes. For example, a higher moisture content (and therefore a higher temperature after heating) in proximity of one of the longitudinal edges of the continuous web may be due to the fact that the reel B1, B2, B3, B4, B5 from which the continuous web comes remained in the warehouse in a vertical position at contact with the floor for a period of time sufficient to cause the rising of moisture by capillarity from the floor inside the turns of web wound in a reel. On the other hand, a temperature profile trend, and a therefore moisture profile trend, with maximum and/or minimum values in one or more intermediate positions may indicate uneven heating of the continuous web, or uneven application of the adhesive agent.

FIGS. 5A, 5B, 5C, 5D and 5E show temperature profiles and therefore moisture profiles under various conditions. Profiles can be acquired at different positions along the production line. Depending on the position where they were acquired, possible unevenness in the profile may be due to various reasons.

Figure 5A:
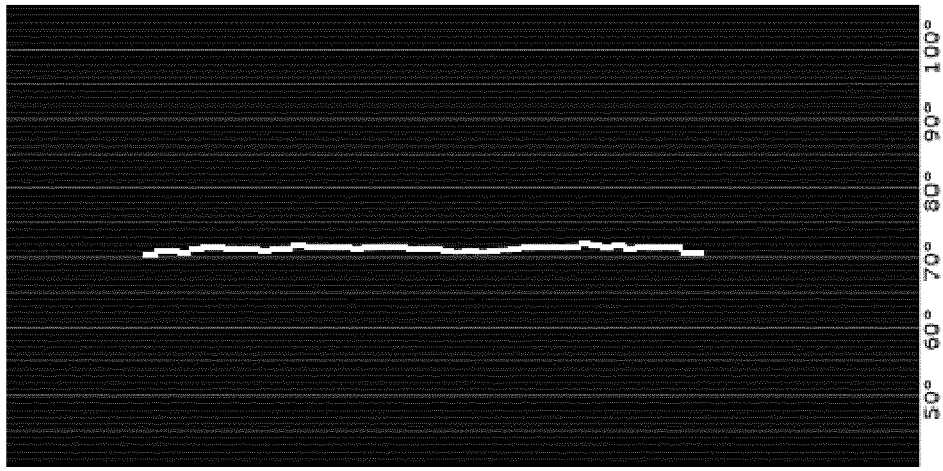
FIGS. 5A, 5B, 5C, 5D and 5E show temperature profiles which can be detected with a thermographic camera.

In FIG. 5A the temperature profile detected by the thermographic camera is substantially even. A profile of this type indicates the correct operation of the system.

Figure 5B:
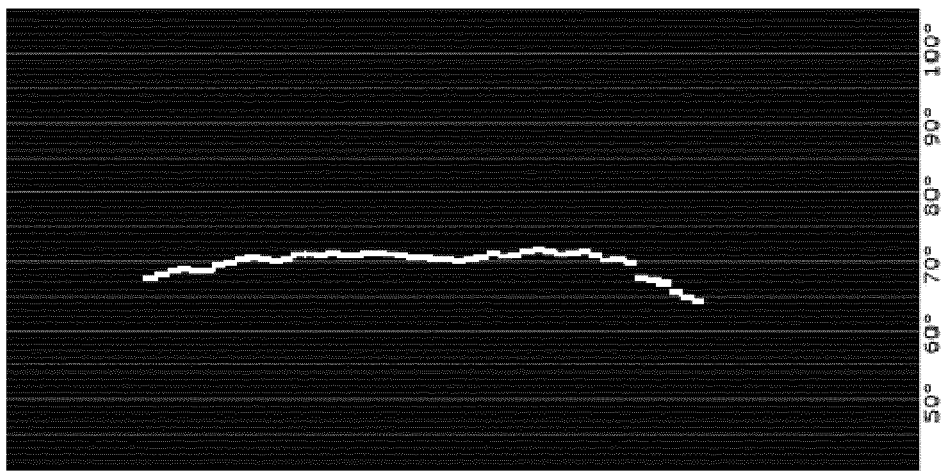
Figure 5C:
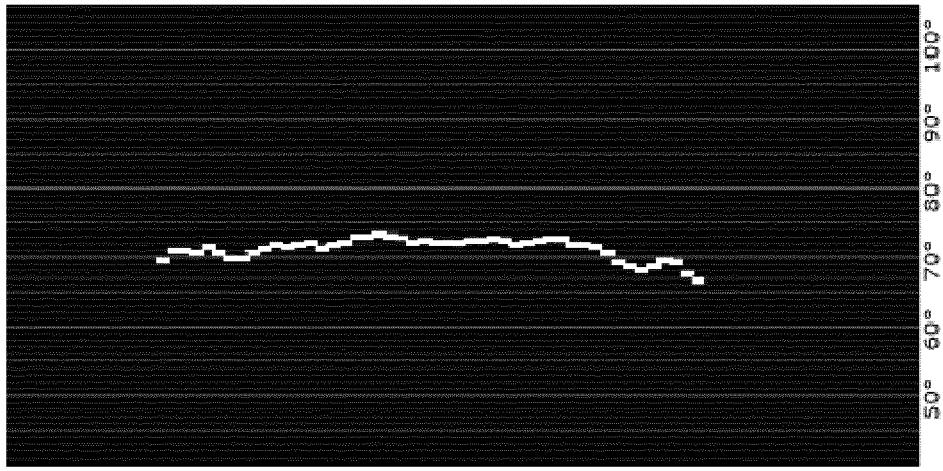

FIGS. 5B and 5C show two temperature profiles approximately symmetrical with respect to the centreline of the continuous web, with a maximum (or minimum) at the centre and minimum (or maximum) values at the edges, indicating a higher (or lower) moisture content in the central strip of the continuous web. A situation of this kind must be investigated, to detect the cause of uneven distribution of moisture, and corrected.

This defect may arise for various reasons, depending on where the defect was detected along the production line. For example, possible reasons may be:
  crown of the rollers 23, of the corrugating rollers 101, 103 or of the double facer 45;
  problems relating to condensate removal from the rollers 23, from the corrugating rollers 101, 103 or from the double facer 45 or from other heated rollers;
  incorrect paper tensioning;
  non-compliant reel;
  ungluing of the edges of the continuous webs;

Possible corrective measures to eliminate the source of defects may include one or more of the following:
  action on the main heating steam of the single facer;
  action on the roller 23 (or on a pressure belt or other pressure system) of the single facer;
  action on the adhesive applicator;
  adjusting a humidifier unit (described below), possibly acting in a differentiated manner on various areas along the width of the continuous web;
  action on the pressure member which presses the corrugated board onto the double facer 45;
  acting on the steam for heating the double facer 45;
  acting on the brakes that modulate the tension of one or more continuous webs on the supply bridge and/or on the unwinders of the reels.

Figure 5D:
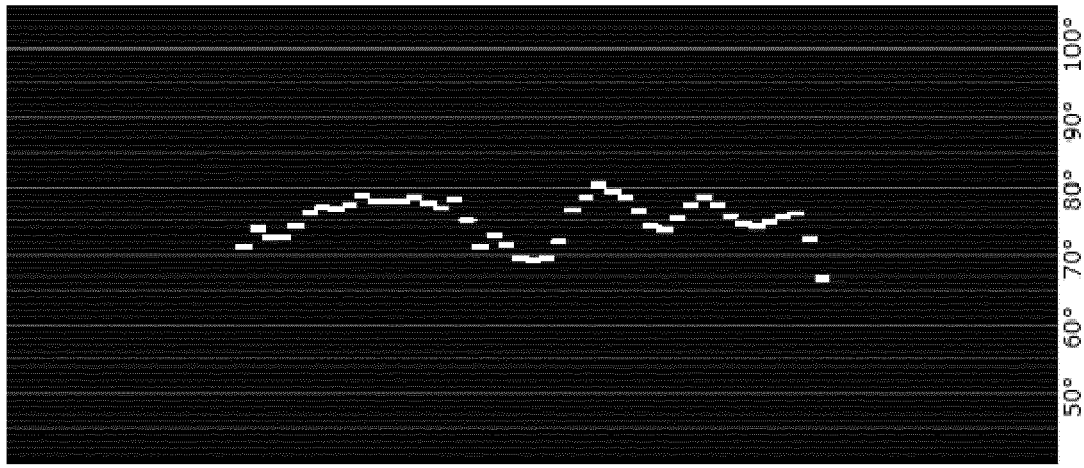
Figure 5E:
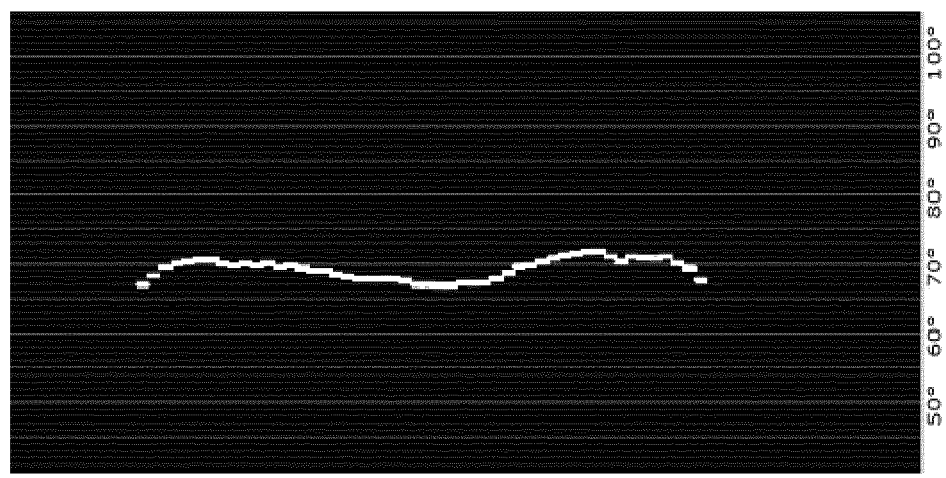

FIGS. 5D and 5E show uneven temperature profiles to be corrected. In these two cases the temperature profiles, corresponding to respective moisture profiles, are strongly uneven with different relative maximum and minimum values, and different values in proximity of the longitudinal edges. Even in this case, the cause of uneven moisture distribution must be found and removed.

Depending on where the image that highlights the defect is captured, the reasons may for example be:
  uneven application of glue;
  uneven pressure of the cardboard on the double facer;
  non-compliant continuous web reel;
  application of uneven tension on the continuous web;
  non-parallel rollers for guiding and wrapping the continuous webs around the heating members.

Possible corrective measures of this type of defect may include, for example:
  action on the adhesive applicator;
  adjusting the humidifier, possibly in a variable manner along the width of the continuous web;
  action on the members for pressing the cardboard against the double facer 45;
  adjusting the parallelism of the rollers for applying the adhesive in the single facers or upstream of the double facer;
  adjusting the parallelism of the wrapping rollers associated with the heating and pre-heating rollers.

When thermographic cameras are provided upstream and downstream of one or more heaters, they can be used in combination to detect a temperature difference, which may be related to any measured transverse shrinkage, and assessments of the content and distribution of moisture in the continuous web may be carried out based on the collected data.

In other cases, instead of a temperature change detected using thermographic cameras upstream and downstream of a heating device, an absolute temperature measurement may be carried out using a single thermographic camera, in order to evaluate any unevenness and identify the causes thereof and consequently take action on the process parameters to correct the malfunctions.

In general, the control system 121 can be programmed to carry out, on one or more of the transverse profiles detected by one or more of the aforementioned thermographic cameras, a detection of the maximum and of the minimum temperature value, corresponding to a maximum and a minimum moisture value.

Furthermore, the control system 121 may be programmed to carry out, on one or more of the detected temperature profiles, a calculation of the mean temperature value, corresponding to a mean moisture value, as well as a detection of the temperature profile trend.

In some embodiments, the mean temperature value can be used as a process control signal, in a feedback loop, with the aim of intervening on the heating conditions of the respective continuous web, in order to reach and maintain a mean temperature value corresponding to the desired value to obtain gluing. As a matter of fact, both in the single facers 7 and in the double facer 45 there arises the need to guarantee a given temperature of the incoming continuous webs in order to obtain correct gluing. This temperature is determined based on experience and it can be a function of many factors, such as in particular paper grammage, type of fibres used, process parameters such as production speed and pressure at which the continuous webs to be glued are pressed against each other, temperature of the corrugating rollers and double facer, etc.

The mean temperature value, calculated by means of the temperature profile detected by thermographic cameras, allows to intervene on the heating conditions of the respective continuous web, for example by increasing or decreasing the arc of contact between the continuous web and the respective heating member. To this end, the control system 121 can generate an actuation signal, which acts on the adjustment devices associated with the respective heating members.

The difference between the maximum temperature and the minimum temperature along a given temperature profile may indicate an incorrect operation of the line and therefore the control system 121 may be programmed to provide an alarm or information through a user interface, so as to request the intervention of an operator, for example to reduce or eliminate a situation of the type illustrated in FIG. 5B, where an abnormal temperature increase (or decrease) occurs in the central area of the continuous web.

Also the abnormal situation of FIG. 5D can be detected by the control system 121 and signalled to the operator. In this case there is not only an abnormal and inadmissible difference between maximum and minimum temperature value along the profile, but also an uneven trend, with several peak values, which may indicate an abnormal moisture distribution on the continuous web, or an uneven temperature condition of the heating member Situations of this type may arise, for example, from accumulations of condensate in the heated members, including the heating rollers, the corrugating rollers and the double facer, from an abnormal and uneven distribution of the adhesive agent, resulting in an abnormal distribution of the moisture content, from a misalignment of the rollers, an incorrect guide of continuous web, which may correspond to a condition of uneven contact with the heating members (heating rollers, corrugating rollers, double facer), or other factors.

The shape of the temperature profile, the presence of one or more temperature peaks (maximum or minimum), the difference between maximum and minimum temperatures and the position where the temperature unevenness is detected, provide useful information for a corrective action.

In principle, the correction intended to eliminate the cause of an abnormal temperature profile, and therefore of moisture profile, can be a manual correction, carried out by an operator responsible for managing the line.

However, the possibility cannot be ruled out of creating, through processes of self-learning and sharing of the data collected on one or more production lines similar to each other, a database that allows to identify (at least statistically) the probable cause of an abnormal temperature profile and to automatically correct the process parameters, or at least to suggest to an operator the possible causes of malfunction, in order to allow a more rapid intervention.

In general, and regardless of the corrective action modes (manual, semi-manual or automatic), the temperature profile detected by each thermographic camera can be used to provide indications on the presence of the following operational problems:

presence of moisture strips in the continuous web;
problems relating to the application of the adhesive agent;
paper tensioning problems;
problems relating to uneven heating of the heating members (heating rollers or plates, corrugating rollers, double facer); problems relating to evacuation of condensate and/or recirculation of steam in the heating members.

The devices described above allow further controls and operations to be carried out on the production line, besides those suggested or required due to abnormal temperature profile patterns.

As a matter of fact, it is known that a continuous paper web tends to shrink transversely due to moisture release. The heating of the various continuous webs by means of the different heating elements described above causes a decrease in moisture content and therefore a transverse shrinkage. This transverse shrinkage is detected, concerning all or some of the continuous webs and concerning all or some of the groups of heating members, by means of the aforementioned systems for detecting the transverse shrinkage.

The final moisture content of the continuous webs is an important parameter for the shape stability of the corrugated board sheet obtained at the end of the production line, after the continuous corrugated board web C is divided into sheets and the after stacking them. Similar problems can be found in the case where the corrugated board web is not cut into single sheets, but folded in a zigzag fashion and accumulated in a stack.

An uneven moisture content between the various sheets or between the transvesely folded portions of the corrugated board causes a deformation over time due to warping. This is caused by a differential absorption of environmental moisture by the individual sheets or portions into which the corrugated board is divided. In particular, for example if, at the end of the production process, the two liners formed by the sheets N1, N5 have different moisture content (percentages), they will tend to absorb a different amount of environmental moisture, and inversely proportional to the moisture content at the end of the production process, until an equilibrium condition is reached, in which the moisture content is substantially equal for all the sheets that form the corrugated board.

Detecting the transverse shrinkage caused by the heating of a given continuous web allows to detect the amount of moisture that the continuous web lost along the advancement path between the first and second device for detecting the transverse dimension of the continuous web, between which a heating member is usually arranged. Systems for detecting the transverse shrinkage associated with the paths of two continuous webs converging toward a gluing area (for example, continuous webs NS1, NS2, N5 toward the double facer) allow to check whether the moisture loss of individual webs is substantially the same or whether it falls within a tolerance range in any case. If this is not the case, that is if there is a differential moisture loss between two or more webs converging toward a gluing area, and this difference may be detrimental to the shape stability of the final corrugated board, the control system 121 may intervene by changing the operating conditions of one or more of the heating members.

Similarly, the shrinkage of the two outer liners (N2, N5) of the corrugated board web C can be detected by detecting the shrinkage of the first liner N2 which is supplied to the single facer which forms the single face corrugated board web NS1 and of the second liner N5 which is supplied to the double facer 45.

In general, it is possible to detect the shrinkage, and thus determine the change in moisture, in any of the continuous webs processed in the production line, and these data can be used to determine whether there is a need for a correction of the operating conditions in order to avoid subsequent deformation problems caused by a differential widening of continuous webs adhered to each other in the finished corrugated board C in the subsequent storage period.

For example, if two generic continuous webs Ni, Nj were subject to different transverse shrinkage, to an extent of potentially causing a warping of the corrugated board sheets produced, the control system 121 may vary the operating conditions of the respective heating members, by increasing the heating of the continuous web that lost the least amount of moisture (and thus was subject to the lowest transvers shrinkage) and decreasing the heating of the continuous web that lost the highest amount of moisture. These operations may be carried out respectively by increasing and decreasing the arc of contact between the respective continuous web and the respective heating member. The corrective action is therefore almost immediate, and it does not require a change in the temperature and/or flow rate of steam or other thermal transfer fluid in the heating members.

The control and change of the heating conditions are carried out in such a way that the temperature of the continuous webs remains within the tolerance range to achieve correct gluing. In this sense, the control system 121 is configured to correlate the temperature trend of the continuous webs with the trend (change) of the transverse dimension thereof.

Some embodiments may provide for generating an alarm in case there is detected an excessive change in the transverse dimension of the continuous.

For one, some or all of the thermographic cameras of the production line 1 other functions carried out by means of the control system 121 may also be provided. In particular, individual images or individual temperature profiles can be stored in real time and selectively over time, in order to store a sequence of images that allows to subsequently evaluate the correct operation of the system and/or the presence of malfunctions.

In some embodiments, the control system 121 can store, for one or more of the thermographic cameras present in the production line 1, the temperature profile along a transverse line of pixels, every n frames acquired in real time or every time interval $\Delta t$. For example, it may be provided to store the signals of the pixels of the selected transverse line for a given thermographic camera every time interval of 10 seconds, or every minute, or every 10 minutes. The set of these pixel lines represents the temperature profile trend of the continuous web over time at that point of the production line 1 where the thermographic camera is positioned.

Figure 6:
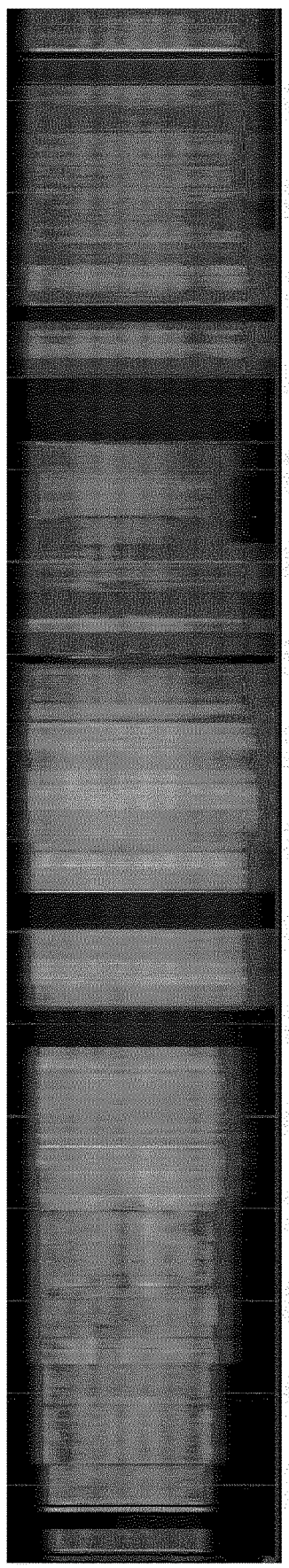
FIG. 6 shows a thermal image obtained from the combination of single transversal lines of pixels acquired from images (frames) acquired sequentially by a thermographic camera over time.

FIG. 6 shows an example of an image obtained in this manner. The discontinuities in the transverse dimension of the image shown in FIG. 6 correspond to a format change of the continuous web. The lower the time interval $\Delta t$, the higher the definition of the thermal image obtained from the sequence of pixel lines shown in FIG. 6.

In some embodiments, the line or plant 1 may comprise humidifying units, configured and controlled to apply a controlled amount of moisture in specific longitudinal strips of a continuous web. By way of example, FIG. 4 shows three humidifying units 131, 133, 135 associated with the advancement paths of the single face corrugated board continuous web NS1, of the single face corrugated board continuous web NS2 and of the smooth paper continuous web N5, respectively. The possibility of arranging the aforementioned humidifying units, or other additional humidifying units, in other positions along the paths of the various continuous webs along the production plant 1 cannot be ruled out.

Each humidifying unit may be divided into sections, for example it may have a sequence of spray nozzles aligned in the transverse direction CD. Each nozzle can be associated with a valve controlled by the control system 121, so as to atomize a controlled amount of water along a given longitudinal strip of the respective continuous web. This allows to correct, under the control of the control system 121 and based on the data collected by the thermographic cameras and/or the systems for detecting the transverse shrinkage, the amount of moisture present in various transverse positions of the respective continuous web.

The invention claimed is:

1. A plant for producing a corrugated board, comprising:
   a first unwinder for unwinding a first continuous paper web from a first reel;
   a second unwinder for unwinding a second continuous paper web from a second reel;
   a third unwinder for unwinding a third continuous paper web from a third reel;
   a single facer configured to receive the first continuous paper web and the second continuous paper web, corrugate the first continuous paper web, and glue together the first continuous paper web and the second continuous paper web along corrugation flutes formed in the first continuous paper web and form a continuous single face corrugated board web;
   a double facer configured to receive the continuous single face corrugated board web and the third continuous paper web and glue the continuous single face corrugated board web and the third continuous paper web together along the corrugation flutes formed in the first continuous paper web and form a continuous corrugated board web;
   at least one first thermographic camera positioned along an advancement path direction of at least one continuous web selected from said first continuous paper web, said second continuous paper web, said third continuous paper web, said continuous single face corrugated board web, and said continuous corrugated board web, for detecting thermographic images of said at least one continuous web;
   a control system comprising a thermographic image processing system which is programmed in relation to each of said at least one thermographic camera to (1) extrapolate in real time from the thermographic images acquired by the at least one thermographic camera temperature profiles according to lines transverse to the advancement path direction of the at least one continuous web framed by the at least one thermographic camera; and (2) determine a maximum temperature value, a minimum temperature value, and an average temperature value along each temperature profile.

2. The plant of claim 1, wherein the control system is adapted to generate a signal when difference between the maximum temperature value and the minimum temperature value along a temperature profile exceeds a predetermined threshold value.

3. The plant of claim 1, wherein the control system is adapted to modify at least one process parameter as a function of a mean value and/or of the difference between the minimum temperature value and the maximum temperature value.

4. The plant of claim 3, wherein arranged along the advancement path direction of the at least one continuous web, wherein the at least one first thermographic camera is inserted, is a heating member interacting with the at least one continuous web to transfer heat to the at least one continuous web, and wherein the process parameter is a parameter adapted to modify heating conditions of the at least one continuous web by the heating member.

5. The plant of claim 4, wherein arranged along the advancement path direction of the at least one continuous web, wherein the at least one first thermographic camera is inserted, is at least one second thermographic camera, the at least one first thermographic camera and the at least one second thermographic camera are arranged downstream and upstream, respectively, of the heating member with respect to the advancement path direction of a respective one of the at least one continuous web.

6. The plant of claim 1, further comprising a humidifying device for adding moisture to said at least one continuous web; and wherein the humidifying device is controlled according to the temperature profiles detected by the control system, so as to correct a moisture unevenness in a transverse direction of the at least one continuous web, corresponding to a temperature profile unevenness.

7. The plant of claim 1, wherein the control system is adapted to store temperature profiles at time ranges and to provide a displayable sequence of said temperature profiles stored as a function of time.

8. The plant of claim 1, further comprising at least one or more further thermographic cameras, positioned to detect thermographic images of at least one or more of said first continuous paper web, said second continuous paper web, said third continuous paper web, said continuous single face corrugated board web, and said continuous corrugated board web.

9. A plant for producing a corrugated board, comprising:
a first unwinder for unwinding a first continuous paper web from a first reel;
a second unwinder for unwinding a second continuous paper web from a second reel;
a third unwinder for unwinding a third continuous paper web from a third reel;
a single facer configured to receive the first continuous paper web and the second continuous paper web, corrugate the first continuous paper web, and glue together the first continuous paper web and the second continuous paper web along corrugation flutes formed in the first continuous paper web and form a continuous single face corrugated board web;
a double facer configured to receive the continuous single face corrugated board web and the third continuous paper web and glue the continuous single face corrugated board web and the third continuous paper web together along the corrugation flutes formed in the first continuous paper web and form a continuous corrugated board web;
at least one first thermographic camera positioned along an advancement path direction of at least one continuous web selected from said first continuous paper web, said second continuous paper web, said third continuous paper web, said continuous single face corrugated board web, and said continuous corrugated board web, for detecting thermographic images of said at least one continuous web;
a control system comprising a thermographic image processing system which, for each of said at least one thermographic camera, is adapted to extrapolate in real time from the thermographic images acquired by the at least one thermographic camera, temperature profiles according to lines transverse to the advancement path direction of the at least one continuous web framed by the at least one thermographic camera; and determine a maximum temperature value, a minimum temperature value, and an average temperature value along each temperature profile; wherein a measurement arrangement for detecting a variation of a transverse dimension of a respective one of the at least one continuous web upstream and downstream of a heating member is arranged along the advancement path of the at least one continuous web, in which the at least one first thermographic camera is provided.

10. The plant of claim 9, wherein the control system is adapted to correlate a temperature trend with a trend of the transverse dimension of the at least one continuous web.

11. A plant for producing a corrugated board, comprising:
a first unwinder for unwinding a first continuous paper web from a first reel;
a second unwinder for unwinding a second continuous paper web from a second reel;
a third unwinder for unwinding a third continuous paper web from a third reel;
a single facer configured to receive the first continuous paper web and the second continuous paper web, corrugate the first continuous paper web, and glue together the first continuous paper web and the second continuous paper web along corrugation flutes formed in the first continuous paper web and form a continuous single face corrugated board web;
a double facer configured to receive the continuous single face corrugated board web and the third continuous paper web and glue the continuous single face corrugated board web and the third continuous paper web together along the corrugation flutes formed in the first continuous paper web and form a continuous corrugated board web;
at least one first thermographic camera positioned along an advancement path direction of at least one continuous web selected from said first continuous paper web, said second continuous paper web, said third continuous paper web, said continuous single face corrugated board web, and said continuous corrugated board web, for detecting thermographic images of said at least one continuous web;
a control system comprising a thermographic image processing system which, for each of said at least one thermographic camera, is adapted to extrapolate in real time from the thermographic images acquired by the at least one thermographic camera, temperature profiles according to lines transverse to the advancement path direction of the at least one continuous web framed by the at least one thermographic camera; and determine a maximum temperature value, a minimum temperature value, and an average temperature value along each temperature profile; wherein arranged along a first advancement path of a first of said at least one continuous web is a first heating member; arranged along a second advancement path of a second of said at least one continuous web is a second heating member; arranged along the first advancement path is a first system for detecting transverse shrinkage of the first continuous web; arranged along the second advancement path is a second system for detecting transverse shrinkage of the second continuous web; and the control system is adapted to receive information on the transverse shrinkage of the first continuous web and the transverse shrinkage of the second continuous web.

12. The plant of claim 11, wherein the control system is adapted to modify at least one operating parameter of the plant to reduce a difference between the transverse shrinkage of the first continuous web and the transverse shrinkage of the second continuous web.

13. The plant of claim 11, wherein the control system is adapted to modify an interaction of at least one of said first continuous web and said second continuous web with a respective one of the first heating member and the second heating member, so as to reduce the difference between the transverse shrinkage of the first continuous web and the transverse shrinkage of the second continuous web, maintaining a temperature of the first continuous web and of the second continuous web within a range of values suitable to glue the first continuous web and the second continuous web.

* * * * *